United States Patent [19] [11] Patent Number: 4,920,359
Arai et al. [45] Date of Patent: Apr. 24, 1990

[54] OPTICAL INFORMATION RECORDING MEDIUM HAVING PROTECTIVE LAYER

[75] Inventors: Yuji Arai; Emiko Hamada; Yuaki Shin; Takashi Ishiguro, all of Tokyo, Japan

[73] Assignee: Taiyo Yuden Co., Ltd., Tokyo, Japan

[21] Appl. No.: 376,213

[22] Filed: Jul. 3, 1989

Related U.S. Application Data

[63] Continuation of Ser. No. 165,637 Mar. 8, 1988, abandoned.

[30] Foreign Application Priority Data

Nov. 23, 1987 [JP] Japan .................. 62-294965

[51] Int. Cl.$^5$ .................. G01D 15/24; G01D 9/00
[52] U.S. Cl. .................. 346/137; 346/135.1; 369/275; 369/283; 369/286; 430/945; 430/495
[58] Field of Search .................. 346/134, 135.1, 137; 369/275, 283, 284, 286, 288; 430/945, 495

[56] References Cited

U.S. PATENT DOCUMENTS

| 3,889,272 | 6/1975 | Lou et al. | 346/76 L |
| 3,911,444 | 10/1975 | Lou et al. | 346/76 L |
| 3,971,874 | 7/1976 | Ohta et al. | 346/76 L |
| 3,990,084 | 11/1976 | Hamisch et al. | 366/76 L |
| 4,000,492 | 12/1976 | Willens | 346/76 L |
| 4,037,251 | 7/1977 | Bricot et al. | 369/283 |
| 4,176,277 | 11/1979 | Bricot et al. | 250/318 |
| 4,278,756 | 7/1981 | Bouldin et al. | 346/76 L |
| 4,525,412 | 6/1985 | Nakane et al. | 346/137 |
| 4,752,554 | 6/1988 | Sato et al. | 346/135.1 |

FOREIGN PATENT DOCUMENTS

| 0083991 | 7/1983 | European Pat. Off. |
| 0143992 | 6/1985 | European Pat. Off. |
| 0182371 | 5/1986 | European Pat. Off. |
| 0226945 | 7/1987 | European Pat. Off. |
| 2271617 | 12/1975 | France |
| 2536197 | 5/1984 | France |
| 0099951 | 5/1981 | Japan | 369/275 |
| 0162092 | 9/1984 | Japan | 369/275 |

OTHER PUBLICATIONS

Patent Abstracts of Japan, vol. 10, No. 116 (P—452) [2173] Apr. 30, 1986; and JP—A—60 243 836 (Matsushita Denki Sangyo K.K.), 03—12—1985.
Patent Abstracts of Japan, vol. 10, No. 135, (P—457)[2192], May 20, 1986; and JP—A—60 256 933, (Matsushita Denki Sangyo K.K.) 18—12—1985.
Patent Abstracts of Japan, vol. 9, No. 83, (P—348)[1806], Apr. 12, 1985; and JP—A—59 213 040, (Ricoh K.K.), 01—12—1984.

Primary Examiner—Bruce A. Reynolds
Assistant Examiner—Huan Tran
Attorney, Agent, or Firm—Flynn, Thiel, Boutell & Tanis

[57] ABSTRACT

An optical information recording medium comprising a substrate, an optical recording layer formed over the surface of the substrate, and a protective layer covering the optical recording layer. The protective layer incorporates an antireflection means, such as a laser beam absorbing means, a laser beam scattering means or a laser beam transmitting means, for preventing the reflection of a laser beam applied to the optical recording layer.

An optical information recording medium of a second embodiment of the present invention, comprises a substrate, an optical recording layer formed over the surface of the substrate, a protective layer covering the optical recording layer, and a buffer layer interposed between the optical recording layer and the protective layer. At least one of the protective layer or the buffer layer incorporates at least one antireflection means, such as a laser beam absorbing means, a laser beam scattering means and a laser beam transmitting means, for preventing the reflection of a laser beam. The buffer layer facilitates precisely forming recording bits in the optical recording layer by locally deforming the optical recording layer by a laser beam.

7 Claims, 2 Drawing Sheets

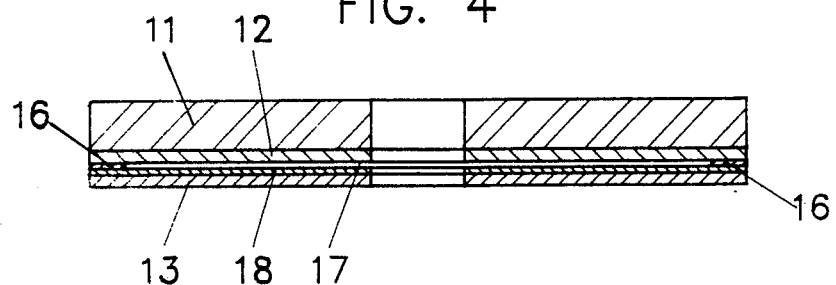
FIG. 4
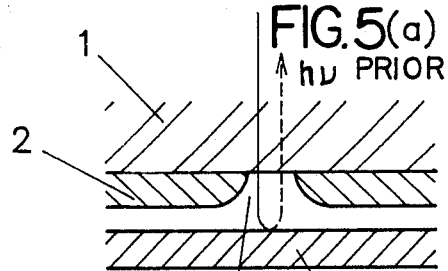
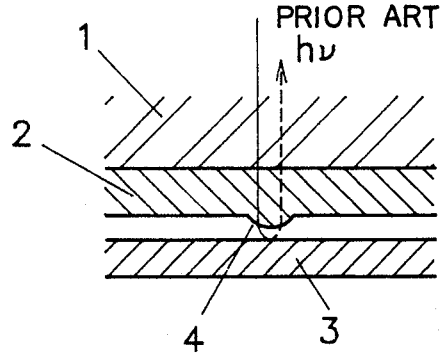
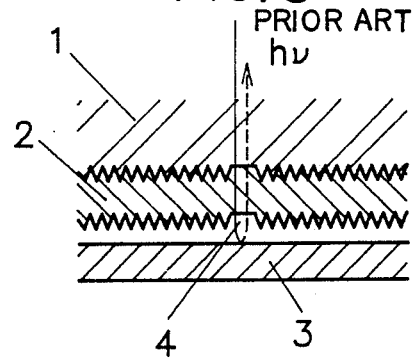
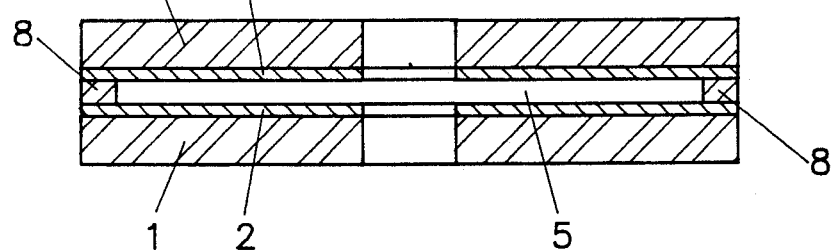

OPTICAL INFORMATION RECORDING MEDIUM HAVING PROTECTIVE LAYER

This application is a continuation of U.S. Ser. No. 07/165,637, filed Mar. 8, 1988 now abandoned.

BACKGROUND OF THE INVENTION

1. Field of the Invention

The present invention relates to an optical information recording medium having an optical recording layer and a protective layer coating the optical recording layer.

2. Description of the Prior Art

An optical information recording medium comprises an annular substrate, such as a glass disc or a plastic disc, an optical recording layer, such as a metallic layer of Te, Bi or Mn, or a layer of a coloring matter, such as cyanine, merocyanine or phthalocyanine, and a protective layer coating the optical recording layer to protect the optical recording layer from being soiled and damaged.

In recording information in such an optical information recording medium, as shown in FIG. 5(a), a laser beam hν is applied to an optical recording layer 2 from the side of a substrate 1 to form a pit 4 of about 1 μm in diameter in the optical recording layer 2 by locally evaporating or sublimating the optical recording layer 2.

In reproducing the recorded information from the optical information recording medium, a laser beam having an energy smaller than that of the laser beam used for recording the information is applied through the substrate 1 to the optical recording layer 2 by a pickup head, not shown, to obtain a reproduced signal from the difference between the optical recording layer 2 and the pit 4 in reflectivity.

Another known optical information recording medium has an optical recording layer 2 formed of a coloring polymer or a metal carbide, in which the optical recording layer is deformed locally by applying a laser beam to the optical recording layer to form a pit. For example, the optical recording layer 2 has a smooth surface and a laser beam is applied to the optical recording layer 2 to deform the surface of the optical recording layer 2 locally in a convex shape or a concave shape as shown in FIG. 5 (b) to form a pit 4, or the optical recording layer 2 has a minutely rugged surface, and a laser beam is applied to the optical recording layer 2 to flatten the minutely rugged surface locally as shown in FIG. 5 (c) to form a pit 4.

The latter optical information recording medium has satisfactory recording characteristics and enables the reproduction of the recorded information with less noise as compared with the former optical information recording medium, because the latter optical information recording medium is free from noise attributable to the deformation of a hole forming the pit and chips scattered in forming the pit.

In reproducing the recorded information from such the former and the latter optical information recording media, part of the laser beam hν penetrating the pit 4 is reflected by the protective layer 3 as typically indicated by arrows in FIGS. 5(a), 5(b) and 5(c), the reflected laser beam passes the pit 4 again, and then the reflected laser beam is detected. Accordingly, the difference between the quantity of light reflected by the pit 4 and that of light reflected by parts other than the pit 4 is small, and hence the C/N of the reproduced signal is small.

In the latter optical information recording medium having the optical recording layer 2 to be deformed for forming a pit, the surface of the optical recording layer 2 cannot be satisfactorily deformed when the surface of the optical recording layer 2 is coated closely with the protective layer, and thereby the recording sensitivity of the optical recording layer 2 is reduced.

To overcome such disadvantages inherent to the former and the latter optical information recording media, the conventional disc-shaped optical information recording media are formed in a construction of a so-called air sandwich type, in which two substrate 1 are joined together with a spacer 8 therebetween to form a gap 5 between optical recording layers 2 as shown in FIG. 6. However, this conventional optical information recording medium has a disadvantage in that the thickness thereof is considerably large. Consequently, it is impossible to form the optical information recording medium in a thickness not greater than 1.5 mm. Such an excessively thick optical information recording medium is unable to be used on conventional compact disc players and is unable to meet standards for the compact disc.

SUMMARY OF THE INVENTION

Accordingly, it is a first object of the present invention to provide an optical information recording medium provided with a protective layer for protecting an optical recording layer, and having a high recording sensitivity and satisfactory reproducing characteristics.

It is a second object of the present invention to provide an optical information recording medium formed in a reduced thickness and capable of achieving the first object of the invention.

To achieve the first object of the invention, the present invention provides an optical information recording medium comprising a substrate 11, an optical recording layer 12 formed over the substrate 11, and a protective layer 13 coating the optical recording layer 12, wherein the protective layer 13 incorporates antireflection means for preventing the reflection of a laser beam.

To achieve the second object of the invention, the present invention provides an optical information recording medium comprising a substrate 11, an optical recording layer 12 formed over the substrate 11, and a protective layer 13 coating the optical recording layer 12, wherein a buffer layer 17 is interposed between the optical recording layer 12 and the protective layer 13, and at least either the protective layer 13 or the buffer layer 17 incorporates antireflection means for preventing the reflection of a laser beam.

In reading recorded data from the former optical information recording medium of the present invention, in which pits are formed by applying a laser beam to the optical recording layer 12 to form holes in the optical recording layer 12, by applying a laser beam hν through the substrate 11 to the optical recording layer 12 by a pickup head, the laser beam penetrating the pit formed in the optical recording layer 12 is prevented from being reflected toward the optical recording layer 12 by the antireflection means. Accordingly, the difference between the quantity of the laser beam reflected by the pits and that of the laser beam reflected by parts other than the pit is sufficiently large, and hence a reproduced signal having a high C/N is obtained. It is also possible to obtain a reproduced signal having low noise from an optical information recording medium of the type in which pits are formed by deforming the surface of the optical recording layer, because a laser beam penetrating the optical recording layer 12 is not reflected by the protective layer 13 in recording and reproducing information.

In forming pits in the optical recording layer 12 of the latter optical information recording medium by applying a laser beam hv to the optical recording layer 12 to deform the surface of the optical recording layer 12, the deformation of the surface of the optical recording layer 12 is absorbed by the buffer layer 17 so that the pits are formed without obstruction and thereby, information is recorded at a high recording sensitivity. Furthermore, since the optical recording layer 12 is coated through the buffer layer 17 with the protective layer 13, the optical information recording medium of the present invention has a thickness far less than that of the conventional optical information recording medium of the air sandwich type.

The above and other objects, features and advantages of the present invention will become more apparent from the following description taken in conjunction with the accompanying drawings.

BRIEF DESCRIPTION OF THE DRAWINGS

FIGS. 2 through 4 are longitudinal sectional views of optical information recording media, in further embodiments, according to the present invention, in which the optical information recording media are enlarged in the direction of thickness;

FIGS. 5(a), 5(b) and 5(c) are fragmentary longitudinal sectional views of assistance in explaining the general conception of optical information recording process; and FIG. 6 is a longitudinal sectional view of a conventional optical information recording medium, in which the optical information recording medium is enlarged in the direction of thickness.

DESCRIPTION OF THE PREFERRED EMBODIMENTS

Optical information recording media, in preferred embodiments, according to the present invention will be described with reference to FIGS. 1(a) through 3.

An optical recording layer 12 is formed of a metal or an organic coloring matter over the surface of a transparent substrate 11. The exposed surface of the optical recording layer 12 is coated with a protective layer 13. An antireflection means is provided at least in the surface of the protective layer 13 facing the optical recording layer 12. In an optical information recording medium in the second aspect of the present invention, a buffer layer 17 is formed between the optical recording layer 12 and the protective layer 13, and an antireflection means is provided at least in either the protective layer 13 or the buffer layer 17.

The substrate 11 is a transparent annular disc formed of polycarbonate, polymethyl methacrylate, epoxy or glass.

The protective layer 13 is formed of polycarbonate, polymethyl methacrylate, polyethylene terephthalate or glass.

The buffer layer 17 is formed of a fluid gas, a fluid liquid, a fluid powder, or an elastic or plastic solid material, such as gelatin, rubber, elastomer, nitrocellulose, acetylcellulose, polyvinyl alcohol, collodion, acrylic resin, polyvinyl formal, polyvinyl butyral, porous polyurethane, a metallic powder of 1 to 20 $\mu$m in grain size, a ceramic powder of 1 to 20 $\mu$m in grain size, a resin powder of 1 to 20 m in gain size, a porous polymer, composite porous polymer, freon gas, air, nitrogen gas or Ar gas. It is preferable to use a material having stable properties and a high fluidity, and capable of being easily deformed for forming the buffer layer 17.

Figure 2:
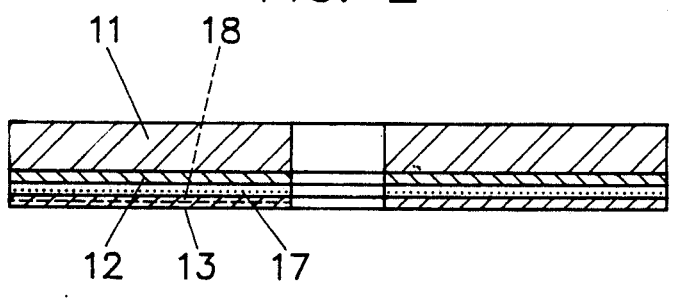

When the buffer layer 17 is formed of a solid material, the optical information recording medium can be formed, for example, in the shape of a disc by closely inserting the buffer layer 17 between the optical recording layer 12 formed over the substrate 11 and the protective layer 13 as shown in FIG. 2.

Figure 1A:
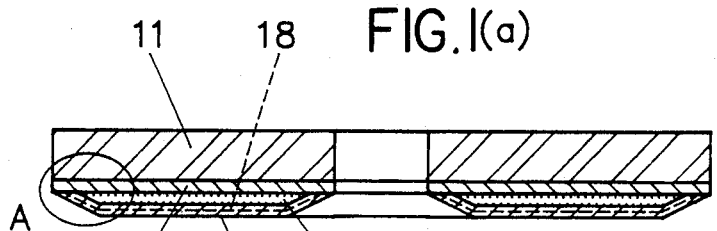
FIG. 1(a) is a longitudinal sectional view of an optical information recording medium, in a first embodiment, according to the present invention, in which the optical information recording medium is enlarged in the direction of thickness.
Figure 1B:
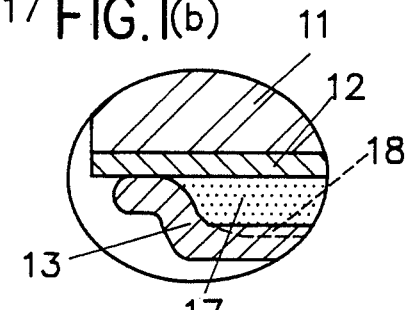
FIG. 1(b) is a fragmentary enlarged longitudinal sectional view of a portion indicated at A in FIG. 1(a)
Figure 3:
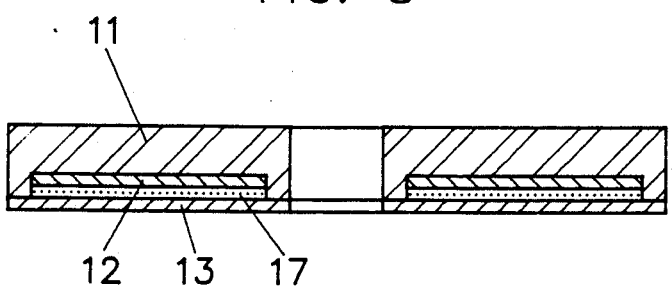

When the buffer layer 17 is formed of a liquid material or a powder material, the protective layer 13 is fastened along the outer and inner circumferences thereof to the substrate 11 as shown in FIG. 1(b) or 3 to seal in the buffer layer 17 between the substrate 11 and the protective layer 13.

The antireflection means makes the buffer layer 17 or the protective layer 13 absorb or scatter the laser beam hv applied to the optical information recording medium from the side of the substrate 11 and transmitted by the optical recording layer 12, or makes the protective layer 13 transmit the laser beam hv. The antireflection means is provided in the buffer layer 17 when the optical information recording medium is provided with the buffer layer 17. The antireflection means is provided in the protective layer 13 when the optical information recording medium is not provided with the buffer layer 17. When the buffer layer 17 is transmissive, the antireflection means may be provided in both the buffer layer 17 and the protective layer 13 or only in the protective layer 13. The antireflection means may be provided entirely in the protective layer 13 or the buffer layer 17 or may be provided, as shown in FIG. 1(a), only over the surface of the protective layer 13 (or the buffer layer 17) facing the optical recording layer 12.

For example, when an antireflection layer 18 absorptive to laser light is formed only over the surface of the protective layer 13 or the buffer layer 17 as the antireflection means, the antireflection layer 18 may be a layer of a velvet coating or a carbon black coating, or a film processed through an antireflection process such as an electrostatic black flocking process. To form the protective layer 13 or the buffer layer 17 entirely in an antireflection layer, carbon black or a coloring matter absorptive to light in the wavelength band of semiconductor laser light, such as a cyanine dye, phthalocyanine, naphthoquinone or titanium black, is dispersed in the protective layer 13 or the buffer layer 17.

To form an antireflection layer 18 capable of scattering laser light over the surface of the protective layer or the buffer layer 17 as the antireflection means, the surface of the protective layer 13 or the buffer layer 17 facing the optical recording layer 12 may be roughened.

To use the protective layer 13 or the buffer layer 17 as an antireflection layer 18 capable of transmitting the laser beam, the protective layer 13 or the buffer layer 17 is formed so that the refractive index thereof increases continuously or stepwise from the side of the surface facing the optical recording layer 12 to the other side. The protective layer 13 or the buffer layer 17 can easily be formed so that the refractive index thereof varies in such a mode, by laminating layers of substances respectively having different refractive indices, forming layers of substances respectively having different refractive indices through a laminar growth process, or by locally adding a metallic compound generally used for adjusting the refractive index of optical glass to the protective layer 13 or the buffer layer 17. Desirably, the ratio of the refractive index of the surface layer to that of the deep portion of the protective layer 13 or the buffer layer 17 is about $1/\sqrt{2}$, and the thickness of the surface layer of the protective layer 13 or the buffer layer 17 is $\lambda/4n$, where $\lambda$ is the wavelength of the semiconductor laser beam, and n is the refractive index of the surface layer.

The antireflection means may be an appropriate combination of the foregoing means respectively for absorbing the laser light, scattering the laser light and transmitting the laser light. For example, the antireflection means may be a combination of the protective layer 13 or the buffer layer 17 provided with laser light absorptive means, and the protective layer 13 or the buffer layer 17 having a rough surface, capable of absorbing the laser light by the laser light absorbing means and scattering the laser light by the rough surface, or may be a combination of the protective layer 13 or the buffer layer 17 provided with a laser light transmissive means in the surface thereof and with a laser light absorptive means provided in the deep portion thereof, capable of transmitting the laser light by the surface and absorbing the laser light by the deep portion.

EXAMPLE 1

A methanol solution of 2% by weight 3-methyl-2-[7-(3'-methyl-2'-benzothiazoline)-1-3-5-heptatrienyl]-benzothiazole perchlorate, namely, a cyanine coloring matter, was prepared. This methanol solution was applied in a film to the surface of a pregrooved annular polymethyl methacrylate substrate 11 with the pregroove having an outside diameter of 120 mm and a thickness of 1.2 mm by a spin coating method, and then the film was dried to form an optical recording layer 12 of approximately 60 nm in thickness.

VELVET coating (Sumitomo 3M, #2010) was applied to one side of an elongate polyethylene terephthalate film of 75 μm in thickness and 150 mm in width through a gravure coating process to form an antireflection layer 18. Then, an annular sheet of 120 mm in outside diameter and 38 mm in inside diameter was cut out from the polyethylene terephthalate film coated with the VELVET coating. Then, the annular sheet was placed over the optical recording layer 12 with the antireflection layer 18 facing the optical recording layer 12, and then the annular sheet was fastened along the outer and inner circumferences thereof to the substrate 11 to form a protective layer 13. Thus, an optical information recording medium as shown in FIG. 1 was fabricated.

In this optical information recording medium, the antireflection layer 18 of the protective layer 13 is simply in contact with the optical recording layer 12 with a thin layer of air serving as a buffer layer 17 therebetween and is not in close adhesion to the optical recording layer 12. The integrated reflection of the antireflection layer 18 with respect to the laser beam $h\nu$ was 1%.

A semiconductor laser beam of 780 nm in wavelength was applied to the optical recording layer 12 from the side of the substrate 11 at a linear speed of 1.4 m/sec and at a recording frequency of 500 kHz to form pits in the optical recording layer 12 for recording. The optimum recording power of the laser beam $h\nu$ measured on the recording surface was 4.0 mW. After recording information in the optical recording layer 12, a laser beam $h\nu$ of 0.3 mW in power was applied to the optical recording layer 12 to measure the C/N of the recording surface. The measured C/N of the reproduced signal was 43 dB.

EXAMPLE 2

An optical information recording medium was fabricated through the same process as that employed for fabricating Example 1, except that the antireflection layer 18 of Example 2 was formed by coating the polyethylene terephthalate film with a paste consisting of carbon black and an acrylic resin through a spraying process instead of coating the polyethylene terephthalate film with VELVET coating. The integrated reflection of the antireflection layer 18 with respect to the laser beam was 4%.

The optical information recording medium of Example 2 was subjected to the same recording and reproducing tests as those applied to testing Example 1. The recording power was 4.0 mW and the C/N of the reproduced signal was 42 dB.

EXAMPLE 3

A methanol solution of 3% by weight 3-methyl-2-[7(3'-methyl-2'-benzothiazoline)-1-3-5-heptatrienyl]-benzothiazole perchlorate, which was used for fabricating the optical information recording medium of Example 1, was prepared. The methanol solution was applied to one side of a pregrooved annular polycarbonate substrate 11 of 130 mm in outside diameter, 38 mm in inside diameter and 1.2 mm in thickness to form an optical recording layer 12 of approximately 60 nm in thickness through the same process as that employed in Example 1.

An antireflection acrylic coating (Asahi Paint) was applied to one side of an elongate polyethylene terephthalate film of 150 m in thickness and 150 mm in width through a spraying process to form an antireflection layer 18. Then, an annular sheet of 130 mm in outside diameter and 38 mm in inside diameter was cut out from the polyethylene terephthalate film coated with the antireflection coating, and then the annular sheet was attached to the substrate 11 in the same manner as that for forming the foregoing examples to form a protective layer 13 covering the optical recording layer 12. The integrated reflection of the antireflection layer 18 with respect to the laser beam $h\nu$ was 1%.

A semiconductor laser beam of 780 nm in wavelength was applied to the optical recording layer 12 at a linear speed of 1.4 m/sec and a recording frequency of 450 kHz to form pits for recording. The optimum recording power of the laser beam $h\nu$ was 4.0 mW. The measured C/N of the reproduced signal was 45 dB.

EXAMPLE 4

A Te alloy was deposited in a film over the surface of the same substrate 11 as that of Example 3 at a film forming speed of 30 nm/min through a vacuum evaporation process to form an optical recording layer 12 of 45 nm in thickness.

An elastomer coating containing dispersed carbon black was sprayed over the surface of the optical recording layer 12 to form a buffer layer 17 of approximately 2 μm in thickness. VELVET coating (Sumitomo 3M, #2010) was sprayed over the buffer layer 17 to form an antireflection layer 18. Then, a protective layer 13 was formed over the antireflection layer 18 by forming an aluminum film through a vacuum evaporation process and coating the aluminum layer with an acrylic hard coating. Thus, an optical information recording medium having a construction as shown in FIG. 2 was fabricated.

The optical information recording medium was subjected to the same recording and reproducing tests as those applied to testing Example 3. The optimum recording power was 5.5 mW and the C/N of the reproduced signal was 48 dB.

EXAMPLE 5

An optical information recording medium having a construction as shown in FIG. 1(a) was fabricated through the same processes as those for fabricating the optical information recording medium of Example 3, except that an alumina ceramic sheet having an antireflection layer 18 formed through an electrostatic black flocking process was used instead of the polyethylene terephthalate film for forming an optical recording layer 12. The integrated reflection of the antireflection layer 18 was 1.2%.

The optical information recording medium was subjected to the same recording and reproducing tests as those applied to testing Example 3. The optimum recording power was 4.1 mW and the C/N of the reproduced signal was 42 dB.

EXAMPLE 6

An optical information recording medium having a construction as shown in FIG. 2 was fabricated through the same processes as those for fabricating the optical information recording medium of Example 4, except than an antireflection layer 18 was formed by spraying a porous antireflection acrylic coating containing titanium black and silica gel as principal components instead of the VELVET coating.

The optical information recording medium was subjected to the same recording and reproducing tests as those applied to testing Example 3. The optimum resording power was 5.0 mW and the C/N of th reproduced signal was 46 dB.

EXAMPLE 7

An epoxy resin dyed with naphthol green B dye was applied by a spin coating method over a pregrooved polycarbonate substrate 11 or 1.2 mm in a thickness to form an optical recording layer 12 of approximately 100 nm in thickness. Then, $MgF_2$ having a refraction index of 1.38 was deposited in a thickness of 130 nm through a vacuum evaporation process over a transparent polycarbonate film having a thickness of approximately 200 nm and a refraction index of 1.59, then the polycarbonate film was placed over the optical recording layer 12 with the $MgF_2$ film facing the optical recording layer 12, and then the polycarbonate film was fastened along the outer and inner circumference thereof to the substrate 11 to form a disc-shaped optical information recording medium of 1.4 mm in thickness.

A semiconductor laser beam hν of 780 nm in wavelength was applied to the optical recording layer 12 from the side of the substrate 11 at a linear speed of 1.4 m/sec and a recording frequency of 500 kHz to record information in the optical information recording medium. The optimum recording power of the laser beam was 4.3 mW. Then, a laser beam hν of 0.3 mW in power was applied to the optical recording layer 12 to reproduce the recorded information. The C/N of the reproduced signal was 45 dB.

EXAMPLE 8

An acrylic resin containing dispersed phthalocyanine cobalt salt was applied to the surface of a prepitted glass substrate 11 by a spin coating method in a film of 100 nm in thickness, and then the same film was overcoated with a glass layer of 20 nm in thickness to form an optical recording layer 12. Then, a polymethyl methacrylate film containing carbon black as an antireflection agent was placed over the surface of the optical recording layer 12 in a nitrogen gas atmosphere to form a protective layer 13, and then the polymethyl methacrylate film was fastened along the outer and inner circumferences thereof to the substrate 11 to seal in nitrogen gas as a buffer layer 17. Thus, an optical information recording medium of 1.45 mm in thickness having construction as shown in FIG. 1 was fabricated.

The optical informatin recording medium was subjected to the same recording and reproducing tests as those applied to testing Example 1. The optimum recording power was 4.2 mW and the C/N of the reproduced signal was 46 dB.

EXAMPLE 9

A Te alloy was deposited in a thickness of 50 nm over the surface of an epoxy substrate 11 of 1.2 mm in thickness having a minutely rough surface through a vacuum evaporation process to form an optical recording layer 12. A polyvinyl alcohol containing dispersed carbon black, and an acrylic hard coat were formed as a buffer layer 17 and a protective layer 13 over the optical recording layer 12. Thus, an optical information recording medium of 1.4 mm in thickness having a construction as shown in FIG. 3 was fabricated.

The optical information recording medium was subjected to the same recording and reproducing tests as those applied to testing Example 1. The optimum recording power was 5.4 mW and the C/D of the reproduced signal was 46 dB.

EXAMPLE 10

A methylethyl ketone solution of 3% by weight 1-1'-dibutyl-3-3-3'-3'-tetramethyl-4-5-4'-5'-dibenzoin-dodicarbocyanine perchlorate and 0.6% by weight Ni-bis (trichlorobenzene dithiol) tetra (t-butyl) ammonium (Mitsui Toatsu fine, #PA-1006) was prepared. The methylethyl ketone solution was applied by a spin coating method to the surface of an annular pregrooved polycarbonate substrate 11 of 120 mm in outside diameter and 1.2 mm in thickness coated with a transparent acrylic UV setting resin, and then the methylethyl ketone solution was dried to form an optical recording layer 12 of approximately 70 nm in thickness.

A polyurethane coating containing dispersed carbon was sprayed in an annular area of 118 mm in outside diameter and 40 mm in inside diameter over one side of an elongate polycarbonate film of 200 μm in thickness and 150 mm in width coated with a heat sealant film and an aluminum film. Then, an annular sheet of 120 mm in outside diameter and 38 mm in inside diameter was cut out concentrically with the annular area coated with the polyurethane coating from the polycarbonate film, the annular sheet was placed concentrically over the substrate 11 with the coated surface facing the optical recording layer 12, and then the annular sheet was heat-sealed along the outer and inner circumference thereof to the substrate 11. Thus, an optical information recording medium of 1.45 mm in thickness having a protective layer 13 and an antireflection layer 18 as shown in FIG. 1(a) was fabricated. The integrated reflection with respect to a laser beam hν of the antireflection layer 18 was 1%.

A semiconductor laser beam hν of 780 nm in wavelength was applied to the optical recording layer 12 from the side of the substrate 11 at a linear speed of 1.4 m/sec to record EFM signals. Then, a laser beam of 0.3 mW in power was applied to the optical recording layer 12 to reproduce the recorded EFM signals. The EFM signals were reproduced in a satisfactory eye pattern. The jitter was 26.5 nS.

EXAMPLE 11

$Pb_5Te_{87}Se_8$ was deposited over the surface of a glass substrate 11 of 120 mm in outside diameter, 38 mm in inside diameter and 1.2 mm in thickness through a ternary vacuum evaporation to form an optical recording layer 12. A thin glass plate of 120 mm in outside diameter, 38 mm in inside diameter and 225 μm in thickness was coated with a thin film of $MgF_2$ having a refraction index smaller than that of the thin glass plate through a vacuum evaporation process to form an antireflection layer 18. The integrated reflection of the thin $MgF_2$ film was 0.8%.

The thin glass plate was placed over the glass substrate 11 with the thin $MgF_2$ film facing the optical recording layer 12, and then the thin glass plate was attached adhesively with an adhesive 16 along the outer and inner circumferences thereof to the substrate 11 to fabricate an optical information recording medium as shown in FIG. 4.

The optical information recording medium was subjected to the same recording and reproducing tests as those applied to testing Example 10. The results of the recording and reproducing tests were substantially the same as those of Example 10.

EXAMPLE 12

An ethanol solution of 4% by weight 1-1'-diethyl-3-3-3'-3'-tetramethyl indocarbocyamine iodide was prepared. The ethanol solution was applied to the surface of a transparent annular acrylic substrate 11 of 120 mm in outside diameter and 1.2 mm in thickness having a pregrooved layer of a UV setting resing by a spin coating method, and then the film of the ethanol solution was dried to form an optical recording layer 12 of approximately 70 nm in thickness.

The surface of an acrylic film containing dispersed carbon black was subjected to sand-blasting to finish the surface in an appropriate surface roughness, and then an annular sheet of 120 mm in outside diameter and 38 mm in inside diameter was cut out from the acrylic film. The annular sheet was placed concentrically over the substrate 11 with the sand-blasted surface facing the optical recording layer 12, and then the annular sheet was attached adhesively along the outer and inner circumferences thereof to the substrate 11 with an adhesive having a high melting point. Thus, an optical information recording medium of 1.4 mm in thickness having a protective layer 13 having an antireflection function was fabricated.

Control 1

A substrate 1 having an optical recording layer 2 formed through the same process as that for forming the optical recording layer 12 of Example 1 was immersed in a carbon tetrachloride solution of 3% by weight nitrocellulose to form a protective layer 3 of porous nitrocellulose over the optical recording layer 2. Thus, an optical information recording medium as shown in FIG. 5 was fabricated.

The optical information recording medium was subjected to the same recording and reproducing tests as those applied for testing Example 1. The optimum recording power was 4.2 mW and the C/N of the reproduced signal was 32 dB.

Control 2

An optical information recording medium was fabricated through the same processes as those for fabricating Example 3, except that the elongate polyethylene terephthalate film was not subjected to through the antireflection treatment.

The optical information recording medium was subjected to the same recording and reproducing tests as those applied to testing Example 3. The optimum recording power was 4.0 mW and the C/N of the reproduced signal was 34 dB.

Control 3

An optical information recording medium was fabricated through the same processes as those for fabricating Example 3, except that a bright black coating was used instead of the antireflection acrylic coating for forming the antireflection layer 18. The integrated reflection of the protective layer 13 on the side of the optical recording layer 12 was 6.2%.

The optical information recording medium was subjected to the same recording and reproducing test as those applied to testing Example 3. The optimum recording power was 3.8 mW and the C/N of the reproduced signal was 36 dB.

Control 4

An optical information recording medium was fabricated through the same processes as those for fabricating Example 6, except that titanium black was not added to the porous antireflection acrylic coating. The integrated reflection of the protective layer 13 on the side of the optical recording layer 12 was 10.5%.

The optical information recording medium was subjected to the same recording and reproducing tests as those applied to testing Example 3. The optimum recording power was 5.0 mW and the C/N of the reproduced signal was 34 dB.

Control 5

An optical information recording medium was fabricated through the same processes as those for fabricating Example 7, except that a polycarbonate film of approximately 200 μm in thickness was placed, instead of the $MgF_2$, over the optical recording layer 12 formed over the substrate 11, and the polycarbonate film was fastened along the outer and inner circumferences thereof to the substrate 11. A semiconductor laser beam of 780 nm in wavelength was applied to the optical recording layer 12 from the side of the substrate 11 at a linear speed of 1.4 m/sec and recording frequency of 500 kHz to record information in the optical recording layer 12. The optimum recording power was 4.5 mW and the C/N of the reproduced signal was 35 dB.

Control 6

An optical information recording medium was fabricated through the same processes as those for fabricating Example 10, except that the polyurethane coating containing dispersed carbon was not applied to the surface of the protective layer 13.

The optical information recording medium was subjected to the same recording and reproducing tests as those applied to testing Example 10. The reproduced eye pattern was indistinct and the jitter was 39.0 nS.

As is apparent from the foregoing description, according to the first aspect of the present invention, the laser beam penetrating through the optical recording layer 12 is reflected by the antireflection means, so that the laser beam penetrating through the optical recording layer 12 will not travel again through the pits and hence no reflective laser beam is detected by the pickup head. Accordingly, reproduced signals having a high C/N ration are obtained.

According to the second aspect of the present invention, the buffer layer 17 of the optical information recording medium in which the surface of the optical recording layer 12 is deformed locally by a laser beam facilitates the local deformation of the suface of the optical recording layer 12. Therefore, information can be recorded at a high recording sensitivity, the optical recording layer 12 is protected by the protective layer 13 and the optical information recording medium can be formed in a reduced thickness as compared with the conventional optical information recording mediums of the same type.

Although the present invention has been described in its preferred forms with a certain degree of particularity, many changes and variations are possible therein. It is therefore to be understood that the present invention may be practiced otherwise than specifically described herein without departing from the scope and spirit thereof.

What is claimed is:

1. An optical information recording medium comprising:
   a substrate;
   an optical recording layer formed over the surface of the substrate;
   a protective layer covering the optical recording layer, said protective layer having incorporated therein antireflection means for preventing the reflection of a laser beam, said antireflection means being means for absorbing the laser beam in combination with means for scattering the laser beam; and
   a buffer layer made of gaseous matter interposed between the optical recording layer and the protective layer.

2. An optical information recording medium comprising:
   a substrate;
   an optical recording layer formed over the surface of the substrate;
   a protective layer covering the optical recording layer, said protective layer having incorporated therein antireflection means for preventing the reflection of a laser beam, said antireflection means being a member selected from the group consisting of means for scattering the laser beam and means for scattering a laser beam in combination with means for transmitting the laser beam; and
   a buffer layer made of gaseous matter interposed between the optical recording layer and the protective layer.

3. An optical information recording medium as claimed in claim 2, wherein said means for scattering the laser beam comprises a roughened surface of said protective layer.

4. An optical information recording medium comprising:
   a substrate;
   an optical recording layer formed over the surface of the substrate;
   a protective layer covering the optical recording layer; and
   a buffer layer interposed between the optical recording layer and the protective layer, said buffer layer having incorporated therein antireflection means for preventing the reflection of a laser beam, said antireflection means being two or more members selected from the group consisting of means for absorbing the laser beam, means for scattering the laser beam and means for transmitting the laser beam.

5. An optical information recording medium as claimed in claim 4, wherein said means for scattering the laser beam comprises a roughened surface of said buffer layer and said means for transmitting the laser beam comprises said buffer layer having a stepwise or continuous increase in refractive index from the side facing the optical recording layer to the other side.

6. An optical information recording medium comprising:
   a substrate;
   an optical recording layer formed over the surface of the substrate;
   a protective layer covering the optical recording layer, said protective layer having incorporated therein antireflection means for preventing the reflection of a laser beam, said antireflection means comprising one or more members selected from the group consisting of means for absorbing the laser beam, means for scattering the laser beam and means for transmitting the laser beam; and
   a buffer layer interposed between the optical recording layer and the protective layer, said buffer layer having a stepwise or continuous increase in refractive index from the side facing the optical recording layer to the other side.

7. An optical information recording medium as claimed in claim 6, wherein said antireflection means incorporated into said protective layer is one or more members selected from the group consisting of means for absorbing a laser beam and means for scattering the laser beam.

* * * * *